United States Patent [19]
Piras

[11] Patent Number: 4,858,702
[45] Date of Patent: Aug. 22, 1989

[54] HYDRAULIC DISTRIBUTOR FOR PERCUSSION APPARATUS DRIVEN BY AN INCOMPRESSIBLE FLUID UNDER PRESSURE

[75] Inventor: Bernard Piras, Charly, France

[73] Assignee: Establissements Montabert, Saint-Priest, France

[21] Appl. No.: 220,548

[22] Filed: Jul. 18, 1988

[30] Foreign Application Priority Data

Jul. 17, 1987 [FR] France ................................ 87 10501

[51] Int. Cl.⁴ ................................................ B23B 45/16
[52] U.S. Cl. ........................................ 173/134; 91/282
[58] Field of Search ................. 173/134, 135, 137, 13, 173/116; 91/300, 281, 282

[56] References Cited

U.S. PATENT DOCUMENTS

| | | | |
|---|---|---|---|
| 4,474,248 | 10/1984 | Musso | 173/134 |
| 4,563,938 | 1/1986 | Henriksson | 173/134 |
| 4,646,854 | 3/1987 | Arndt et al. | 173/134 |

*Primary Examiner*—Frank T. Yost
*Assistant Examiner*—Willmon Fridie, Jr.
*Attorney, Agent, or Firm*—Herbert Dubno

[57] ABSTRACT

In the body of the distributor (6) is mounted for sliding a valve (21) delimiting with the bore of the distributor in which it is mounted at least one control chamber (22) in permanent communication by means of at least one channel (31) with the control chamber of the distributor. When a hydraulic signal is received in the control chambers, the valve (21) moves, controlling the subsequent movement of the distributor (6) independently of any hydraulic connection made by the percussion piston.

16 Claims, 15 Drawing Sheets

HYDRAULIC DISTRIBUTOR FOR PERCUSSION APPARATUS DRIVEN BY AN INCOMPRESSIBLE FLUID UNDER PRESSURE

FIELD OF THE INVENTION

The present invention relating to an hydraulic distributor for percussion apparatus driven by an incompressible fluid under pressure, fed so that the resultant of the hydraulic forces acting on the percussion piston is alternatively in one direction or the other.

BACKGROUND OF THE INVENTION

A percussion apparatus can comprise a stepped piston sliding in a body and delimiting with its bores a driving chamber subjected alternately, by means of a distributor, to the pressure prevailing in the feed circuit having a high-pressure accumulator, and to the return pressure of the apparatus, and an opposed annular chamber constantly connected to the feed pressure.

The distributor is actuated by hydraulic means according to the position of the percussion piston, for example by providing a control section which, depending on the position of the percussion piston, is subjected alternatively to the feed pressure of the apparatus or to that of the return circuit.

When the feed pressure is applied to the control section of the distributor, the driving chamber of the percussion piston is subjected to this same pressure and that the piston is then accelerated during it percussion travel and, conversely, when the return circuit pressure is applied to the control section of the distributor, the drive chamber of the percussion piston passes through its return travel.

It is understood that it would be possible to design an hydraulically controlled system which would function in the opposite way.

For reasons of design it is known that it is necessary to hold the distributor hydraulically in each position at the ends of its travel during the time separating the command pressure signals provided by the percussion piston and that it is also necessary to allow the distributor to cover its course systematically and completely in order to switch the circuits correctly; in short, the distributor must be "bi-stable".

This dual function may, for example, be achieved by known means by providing calibrated openings in the body of the distributor which permit either the filling of the control chamber of the distributor with fluid under pressure, or the emptying of it towards the return circuit.

However, for practical reasons, these openings, which cannot be connected simultaneously and constantly with the control chamber in order not to cancel their respective actions, are effective only over part of the displacement of the distributor.

It is therefore imperative that the communications established by the percussion piston, during its movement, between the control circuit of the distributor and alternatively the feed circuit and the return circuit of the apparatus should be maintained for a sufficient time to ensure the displacement of the distributor until the opening of the locking orifice.

The relative movements of the percussion piston and the distributor are of very great importance. The accelerations and speeds of movement of the distributor depending on the movement of the percussion piston, as well as the point of hydraulic control of the distributor by the piston during its descent will have to be selected carefully.

The main difficulties encountered arise during the travel of the percussion piston. It is, in fact, known from French patent 2,509,217, for example, that the kinetic energy delivered by the percussion piston to the tool at the moment of impact is partially transmitted to the rock an that the balance may be restored in the form of kinetic energy to the piston.

In this case the piston recoils and remains for a very short time in the vicinity of the tool. Now, as indicated previously, the connection effected by the percussion piston between the control circuit of the distributor and the return circuit must, in this case essentially last sufficiently long to permit the distributor to complete the part of its displacement that will allow it to reach the locking orifice of the following phase of the cycle.

Since the velocity of the piston on approaching the tool is great, the hydraulic switching effected by the piston will therefore have to be produced fairly early in the course of its descent to ensure that in the case of recoil it lasts sufficiently long. In fact, if the control point is close to the moment of the end of the descending travel of the piston, the duration of communications established by the latter is insufficient for the distributor to have had time, during its travel, to reverse the action of its locking orifices, the distributor will then cover only an insufficient part of its travel and will return prematurely to the starting point, remaining at the lock of the preceding phase of the cycle and will then keep the driving chamber of the piston at the pressure of the high-pressure feed circuit, which will have the result of re-accelerating the piston after its recoil and on a weak course, and a very weak second impact will possibly be produced, greatly disrupting the operational cycle of the apparatus.

Conversely, if the control point of the distributor is located too early in the descent of the piston, there is a risk that the distributor will prematurely cover its reverse travel and therefore that the drive chamber of the piston will be switched too early towards the low pressure.

Since this chamber is no longer fed by fluid under pressure, the piston will therefore no longer be accelerated during the end of its travel, and hence there will be a considerable loss of performance and the formation of a vacuum in the drive chamber, with the danger of cavitation if there is a recoil phenomenon.

Naturally, in the case of a percussion apparatus operating with a constant travel, a constant pressure and therefore a constant acceleration, it is known that it is possible to find a compromise and to determine an ideal distributor control point on the descent of the piston, the various operational parameters being fixed.

On the other hand, for an apparatus equipped with a course-variation or pressure-variation system having a fixed distributor control point, the rate of descent of the piston close to the impact varies to considerable extents and the time elapsing between the moment of control and the impact therefore also varies. It then becomes impossible to find a compromise for the position of the distributor control point, that which is correct for a high velocity of the piston being premature for a lower velocity, and if correct for a low piston velocity, being too late for a higher velocity.

OBJECT OF THE INVENTION

The object of the present invention is to remedy these disadvantages by providing an hydraulic distributor which assures in a satisfactory manner the control of the movement of the percussion piston for percussion frequencies which may vary considerably, for example between 300 and 1,000 impacts per minute.

SUMMARY OF THE INVENTION

To this end the distributor is of the type comprising a body sliding in a working cylinder, with the bore of which it delimits in particular a control chamber connected successively to the high-pressure circuit and the low-pressure circuit, depending on the position of the percussion piston, thus placing the drive chamber located at the end of the piston successively in communication with the high-pressure circuit to permit the accelerated descent of the piston and with the low-pressure circuit to permit the return travel of this piston.

According to the invention; there is mounted in a sliding manner a valve delimiting with the bore of the distributor in which it is mounted at least one control chamber permanently communicating by at least one channel with the control channel of the distributor, the shape of the valve and the chambers that it delimits with the bore of the distributor in which it is mounted are such that the resultant of the forces to which it is subjected moves it alternatively in one direction or another according to whether the control chamber is connected to the high pressure or the low pressure, in the valve a circuit is provided, one end of which opens permanently in the control chamber and the other end of which is brought into communication, depending on the position of the valve, with the high pressure or the low pressure, this circuit being in communication with the high pressure after the control chambers have been brought into communication with the high-pressure circuit depending on the position of the piston and being in communication with the low pressure after the cotnrol chambers have been brought into communication with the low-pressure circuit, depending on the position of the piston.

The valve is advantageously mounted coaxially in the body of the distributor.

When the percussion piston transmits an hydraulic signal to the control chambers of the valve and the distributor, the valve instantly changes position on account of its low inertia, this movement necessarily bringing about the diplacement of the distributor, whatever the duration of the hydraulic connection effected by the percussion piston with the control chamber of the latter.

BRIEF DISCUSSION OF THE DRAWING

The invention will be readily understood from the description which follows, with reference to the attached diagrammatic drawing, in which.

SPECIFIC DESCRIPTION

Figure 1:
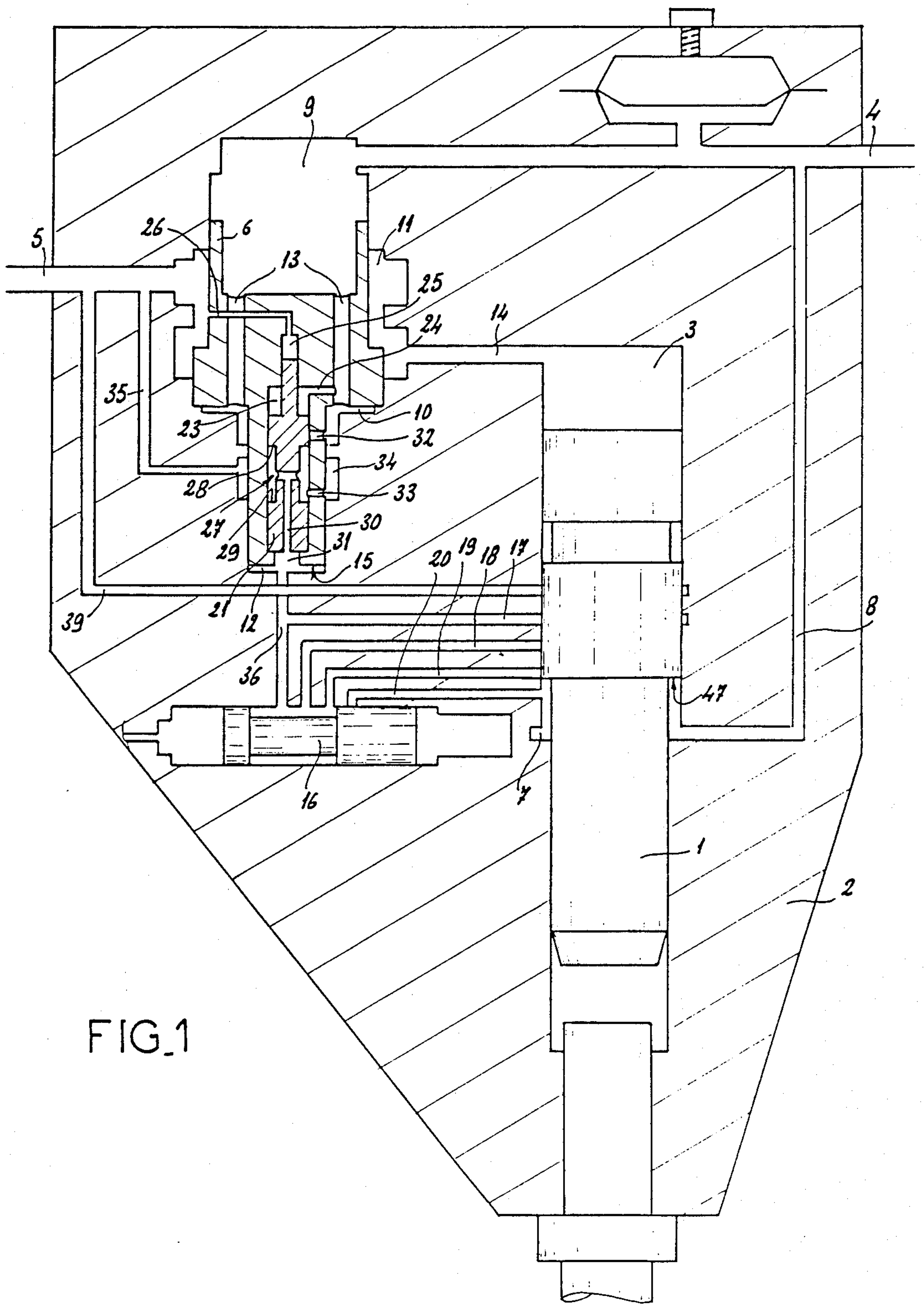
FIGS. 1 to 4 are four longitudinal sectional views of an apparatus equipped with a first distributor during five functional phases.

FIGS. 1 to 10 shows a percussion apparatus operating on a known principle, comprising a piston 1 sliding in a body 2. The percussion piston 1 delimits with its bore the driving chamber 3 located above the piston and an annular chamber 7 of small surface area opposed to the chamber 3. The chamber 7 is in constant connection with the high pressure through the channel 8. The alternating movement of the piston is produced by placing the driving chamber 3 alternately in communication with the high-pressure feed circuit 4 and the low-pressure return circuit 5, so that the resultant of the hydraulic forces acts alternately in one direction and the other. This connection of the chamber 3 alternately with the high pressure and the low pressure is effected by the distributor 6, by the hydraulic means described later.

In the embodiment shown in the drawing the distributor 6 delimits with its bores four chambers 9, 10, 11, 12. Chamber 9 and the annular chamber 10 are connected with each other by wide channels 13 in the body of the distributor 6 and are constantly subjected to the feed pressure, the channel 4 opening directly into the chamber 9. The chamber 11 of small section is opposed to the chamber 10 and is constantly connected to the low-pressure circuit 5. Finally, the chamber 12, the cross-section area 15 of which is greater than that of the chamber 11, known as the control chamber, is opposed to the chambers 9 and 11.

Figure 3:
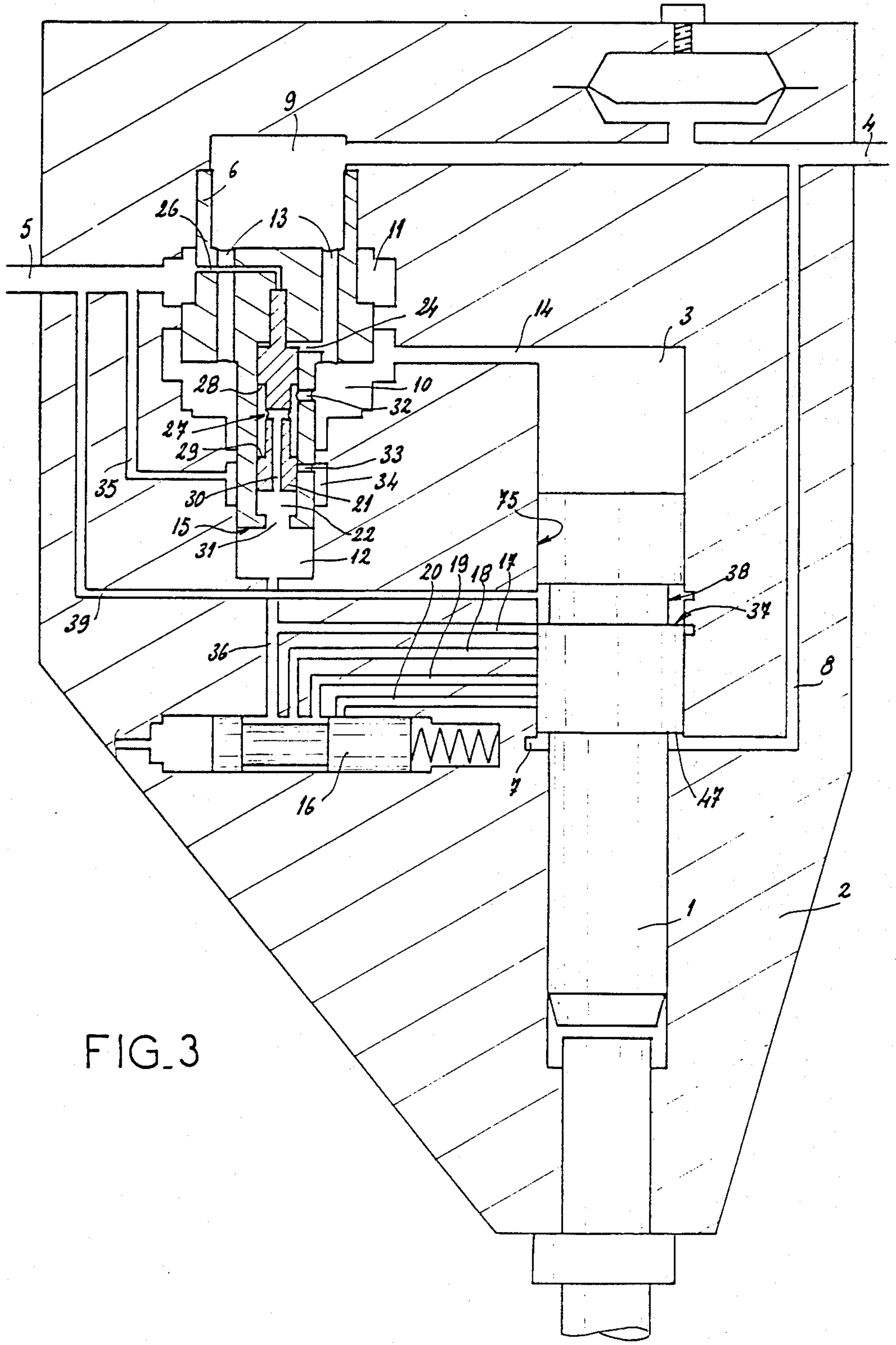

The choice of the areas of the cross-sections of the chambers 9 and 12 is such that when the control chamber 12 is brought to the high feed pressure of the apparatus the distributor 6 assumes the position shown in FIGS. 3 and then places the high-pressure feed circuit in communication with the driving chamber 3 by means of the chamber 9, the channels 13, the chamber 10 and the channel 14 so as to accelerate the piston in its percussion stroke. Conversely, when the control section 15 is connected to a low-pressure circuit, the distributor 6 comes to occupy the position shown in FIG. 1 and connects the chamber 3 with the return circuit 5 of the apparatus and thus permits the rise of the percussion piston 1.

The course of the piston 1 is selected by a known pronciple by means of a valve 16 mounted to slide in the body of the apparatus 2. This valve, which may, for example, be remote-controlled as described in French patent 2,375,008, selects a control channel from a series of channels 17 and 20 opening into the cylinder, the selected channel being able to be connected to the feed circuit of fluid under pressure, once this is uncovered by the edge 47 of the percussion piston.

By way of non-limiting example and to continue the description, it is assumed that the distributor 6 is activated by a descending movement when the control chamber 12 is connected to the return circuit and by a rising movement when the latter is in communication with the feed circuit.

In the apparatus shown in FIG. 1 to 4, the invention consists in providing, sliding in the body of the distributor 6, a staged valve 21 which delimits with its bores a control chamber 22, an opposed annular chamber 23 connected constantly to the feed pressure by the channels 24 and 13 provided in the body of the distributor 6 and a chamber 25 opposed to the chamber 22 permanently connected to the return circuit 5 by the channel 26 provided in the body of the distributor 6. Depending on the pressure acting in the control chamber 22, the resultant of the hydraulic forces acts alternately in one direction or the other.

The valve 21 comprises, moreover, a groove 27 delimited by two edges 28 and 29 directly connected to the control chamber 22 by a channel 30 provided in the body of the valve.

The control chambers of the distributor 6 and the staged valve 21 are constantly connected by a channel 31.

In the body of the distributor 6 two calibrated orifices 32 and 33 are provided which are able to permit alternately, depending on the position of the valve 21, a communication between the groove 27 and the chamber 10 which is constantly connected to the high pressure, or between the groove 27 and the groove 34 provided in the body of the apparatus and itself constantly connected to the return circuit by the channel 35.

The operation of this device is as follows.

FIG. 1 shows the position of the distributor 6 and the valve 21 when the piston 1 rises and is about to uncover the channel 19 selected by the valve 16.

The control chambers 12 and 22 are at this moment connected to the return circuit of the apparatus 5 by means of the channel 30, the groove 27, the orifice 33, the chamber 34 and the channel 35.

The distributor at this time brings the channel 14, and thus the chamber 3, into communication with the return circuit 5, thus permitting the piston 1 to rise, the orifice 33 and the stepped valve 21 then effecting the connection to the low-pressure return circuit of the control chambers.

As soon as the edge of the piston 47 delimiting one end of the chamber 7 uncovers the channel 19, a large quantity of fluid under pressure is able to circulate in the channels 19 and 36 and feed the control chambers 12 and 22. A small quantity of feed fluid under pressure will then circulate through the calibrated orifice 33 so that the pressure which becomes established in the groove 27 and thus in the chambers 12 and 22 is sufficient to alter the direction of the hydraulic resultants acting on the valve 21 and the distributor 6 respectively.

Figure 2:
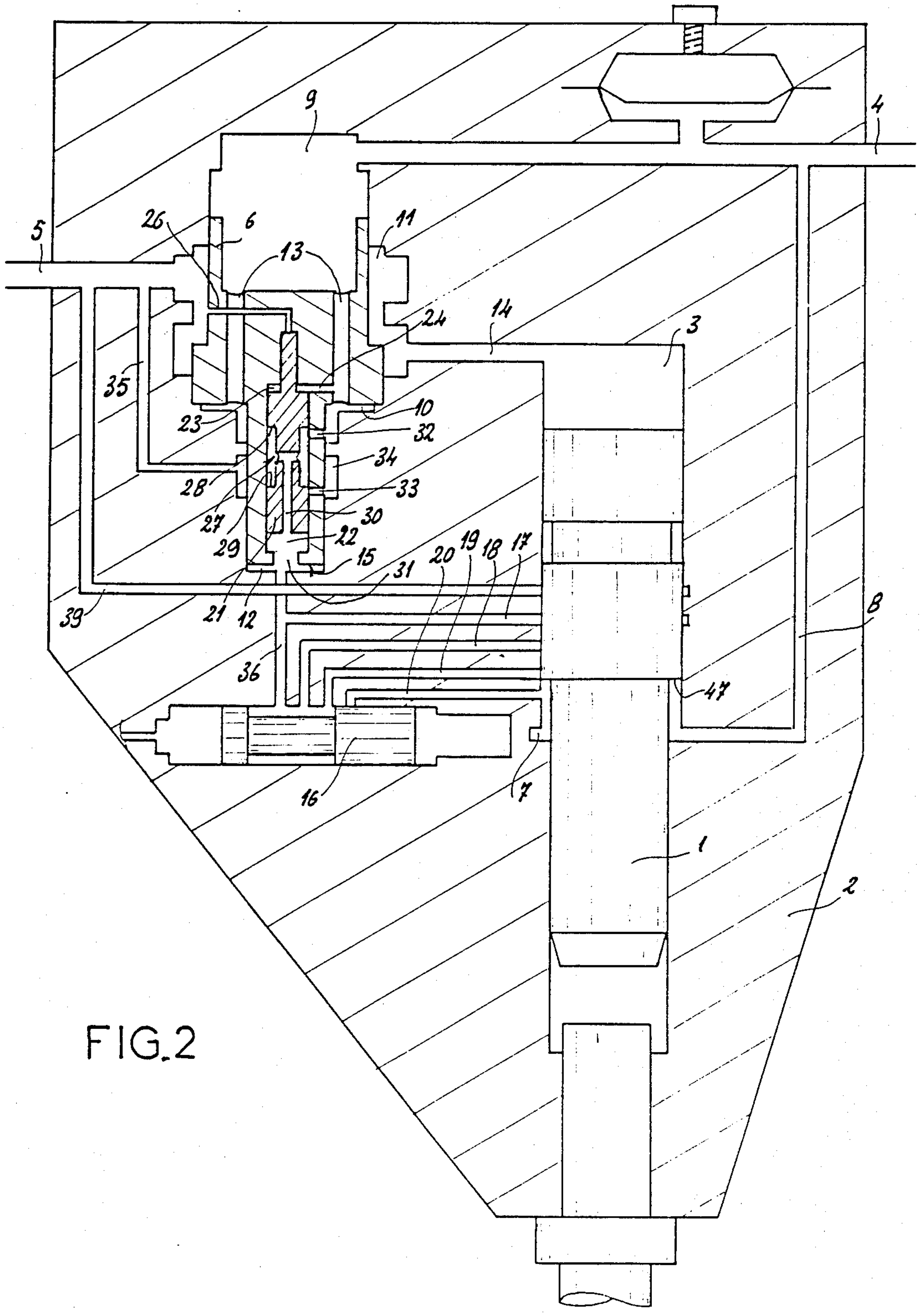

The valve 21, of mass much less than that of the distributor 6, will move rapidly (as shown in FIG. 2), the edge 29 will then close the orifice 33, while, at the same time, the edge 28 will uncover the orifice 32. The groove 27 is then connected to the feed circuit by the orifice 32, assuring in this way a second feed source of fluid under pressure for the control chambers 12 and 22.

Continuing its upward movement, the distributor 6 will break the connection of the channel 14 with the return circuit 5 of the apparatus, then establish a communication between the feed circuit 4 and the drive chamber 3, the fluid under pressure circulating through the chamber 9, the channels 13, the chamber 10 and the channel 14, the percussion piston 1 begins its descent and the edge 47 closes the channel 19. This closing does not interrupt the upward movement of the distributor, since the second high-pressure oil feed of the chamber 12 by the channels 30, 31, 32 (FIG. 3) has received the relay of the initial feed by the channels 19 and 36.

FIG. 3 shows the position of the distributor 6 and the valve 21 when the percussion piston is accelerated in its percussion course and is about to uncover the channel 17.

The chambers 12 and 22 are at this time connected as previously described to the feed circuit by the calibrated orifice 32, the groove 27 and the channel 30.

The distributor 6 agains establishes communication between the feed circuit 4 and the channel 14 connected to the drive chamber 3.

It was seen previously that the piston 1 is accelerated in its percussion course. Shortly before the impact the edge 37 delimiting the lower end of the groove 38 provided in the piston 1 uncovers the channel 17. The groove 38 then effects a connection between the channel 17 and the return circuit 5 of the apparatus by means of a channel 39 provided in the body of the apparatus and opening into the range 75 of the cylinder serving for the displacement of the piston.

The chambers 12 and 22 are then connected by a broadly open circuit to the low-pressure return circuit by the channels 36, 17 and 39. The quantity of fluid likely to circulate through the calibrated orifice 32 at feed pressure is then insufficient to create the pressure necessary for the equilibrium of the distributor 6 and the valve 21. The resultants of the hydraulic forces applied to the distributor and to the valve 21 are reversed.

Figure 4:
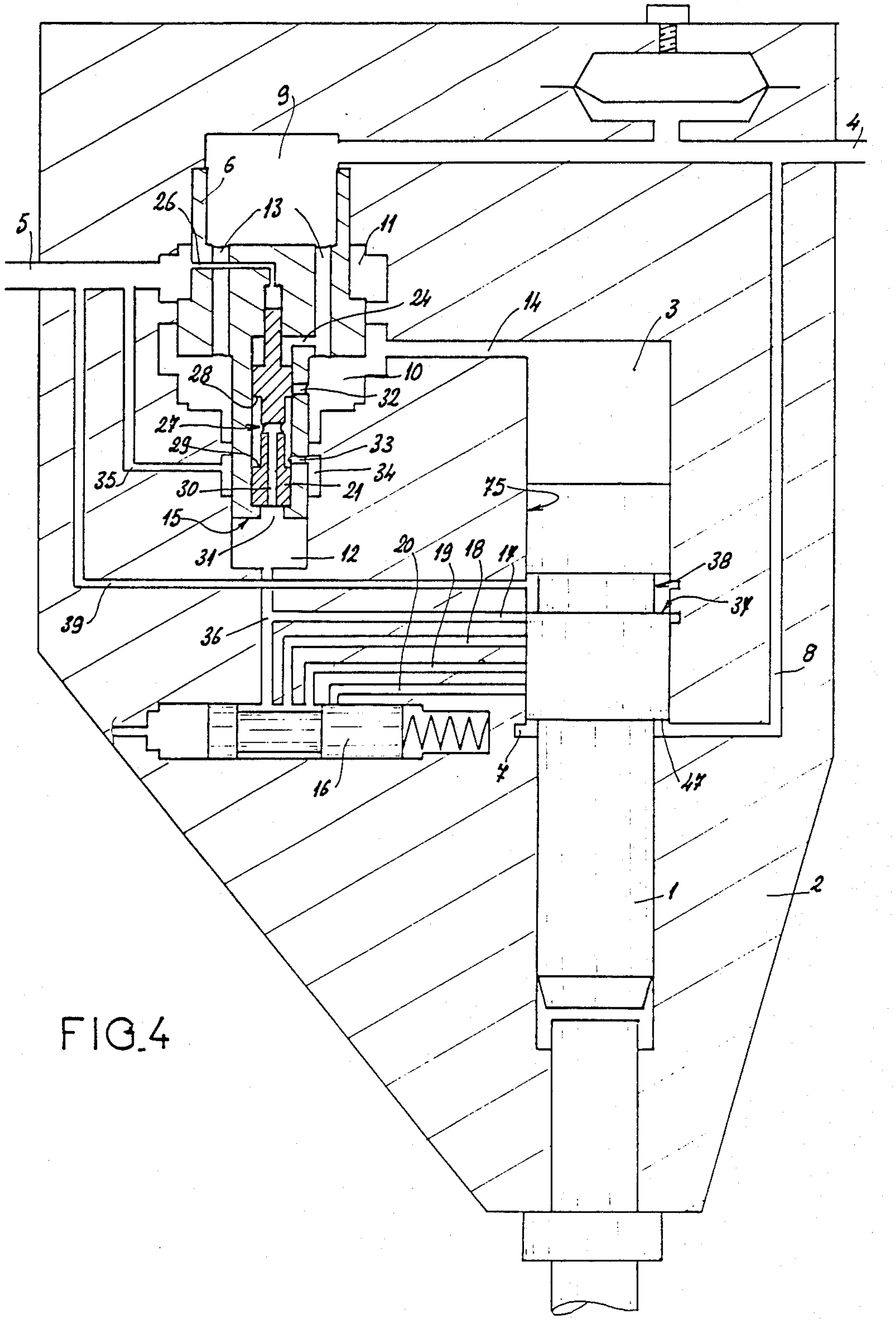

The valve 21 of mass much less than that of the distributor 6 will therefore move rapidly downwards (as shown in FIG. 4). The edge 28 will then close the orifice 32 and at the same time the edge 29 will uncover one end of the orifice 33, the other end opening constantly into the groove 34, the groove 27 will from this time on be connected to the return circuit 5 of the apparatus by the calibrated orifice 33, creating a second circuit for emptying the chamber 12 towards the return circuit 5, permitting in this way the continuation of the downward movement of the distributor 6, even in the case in which the upward recoil of the piston on the tool prematurely re-closes the channel 17 by the edge 37.

Continuing downwardly, the distributor 6 breaks the connection of the channel 14 with the feed of the apparatus, then establishes a communication between the return circuit 5 and the chamber 3 by means of the channel 14, and the piston 1 can then continue its upward movement.

Figure 5:
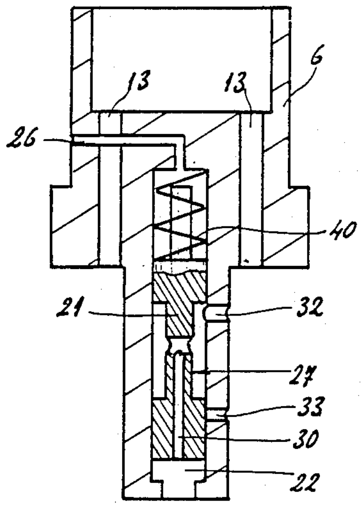
FIG. 5 is a longitudinal sectional view of a variant of the distributor of FIGS. 1 to 4.

FIG. 5 shows a variant of the hydraulic distribution device shown in FIGS. 1 to 4. In this case, the valve 21 delimits with its bore two opposed chambers, one permanently connected to the return circuit and comprising a return spring 40, the other being the control chamber 22, connected alternately to the feed pressure and the return pressure of the apparatus. A groove 27 and a channel 30 are provided in this valve which fulfill the same functions as previously.

The movement of the valve is produced in this case by placing the control circuit under the feed pressure, then by the action of the return spring when the control chamber 22 is subjected to the return pressure of the apparatus.

It may be very useful, during the descent of the distributor, to close rapidly the feed of fluid under pressure of the chamber 3 and slowly to open the emptying circuit for this same chamber in order to avoid the phenomenon of "hammer blows" in the pipelines.

The rise of the distributor, on the contrary, must be rapid at the time of feeding fluid under pressure to restrict load losses. It may also be useful to lock the valve (21) during the movement of the distributor to prevent its possible reaction to changes in pressure, and its very rapid upward movement may be restrained at the end of its travel to prevent any shock in the body of the distributor. Finally, a system of the DASH POT type may slow down the final stage of the rise of the distributor.

A device of this kind is shown in FIGS. 6 to 10 of the drawing.

The valve 21 delimits with its bores a control chamber 22, an opposed annular chamber 23 and another opposed chamber 25. At the end of its travel the valve delimits a buffer chamber 41 as soon as the edge 42 of the valve 21 coincides with the edge 43 delimiting the end of the distributor side of the chamber 41. The chamber 41 is constantly connected to the channel 26 by means of a channel 44 in which is disposed a calibrated orifice 76 in the body of the distributor.

The chamber 23 is connected to the feed pressure when the distributor 6 is at the end of its upward or downward movement by means of a channel 45 provided in the body of the distributor which is related in the low position (FIG. 6) with the groove 70, which is itself connected to the high pressure of the chamber 10 by the channel 72 and in the high position (FIG. 9) directly to the high pressure of the chamber 10. The edges 51 and 73 delimiting the bottom of the chamber 10 and an edge of the groove 70 respectively, determine the time of the locking of the chamber 23 by closing the channel 45 during the movements of the distributor 6.

The chamber 25 is constantly connected to the low-pressure circuit 5 by the channel 26.

The control chamber 22, as previously, is constantly connected to the control chamber 12 of the distributor by the channel 31 provided in the body of the distributor 6.

As previously, a groove 27 delimited by two edges 28 and 29 is provided in the body of the valve 21, and a second groove 52 is also provided in the valve 21, delimited at the upper end by the edge 53, and the two grooves 27 and 52 are constantly connected to each other and to the control chamber 22 by the channel 54 provided in the body of the valve 21.

The distributor 6 defines with its bores, during its travel, six separate chambers: the opposed chambers 9 and 10 described previously and constantly connected with each other by the channels 13, the chamber 12 or control chamber, connected alternately to the high-pressure circuit 4 or the low-pressure return circuit 5, an annular chamber 11 constantly connected to the low-pressure return circuit 5, an annular chamber 55 permanently connected to the feed circuit (by way of example, this is here connected to the chamber 10) by a channel 56 in which is mounted a calibrated orifice 57 made in the body of the apparatus (on the distributor side this chamber is delimited by the edge 58), and finally an annular buffer chamber 59 delimited by an edge 60 on the distributor side and by and edge 61 on the side of the body of the apparatus, this chamber being created when the edge 62 of the distributor coincides with or extends beyond the edge 61; this chamber 59 is always connected to the feed circuit by a channel 63 having a calibrated orifice 64 provided in the body of the apparatus.

Three other large channels are provided in the distributor body. The channel 65, one end of which opens into the range of the cylinder serving to guide the distributor and the other into the range of the cylinder serving to guide the valve 21, which may, depending on the relative positions of the distributor 6 and the valve 21, be isolated or connect the groove 34 and the groove 27. The channels 66 and 67, one of the ends of which opens into the section of the distributor serving to guide the valve 21 and the other into the section of the distributor serving to guide it in the body of the apparatus respectively. The channel 66 will be able, depending on the position of the valve 21, either to be isolated or to be brought successively into communication with the groove 52 and the channel 54, then with the channel 67 by means of the groove 52.

Finally, two grooves are provided in the body of the apparatus: the groove 34, delimited by two edges 68 and 69, permanently connected to the return circuit by the channel 35; and the groove 70, delimited by the edges 71 and 73 and constantly connected by a channel 72 to the feed circuit. By way of example, the channel 72 opens into the chamber 10.

The operation of the apparatus is as follows.

Figure 6:
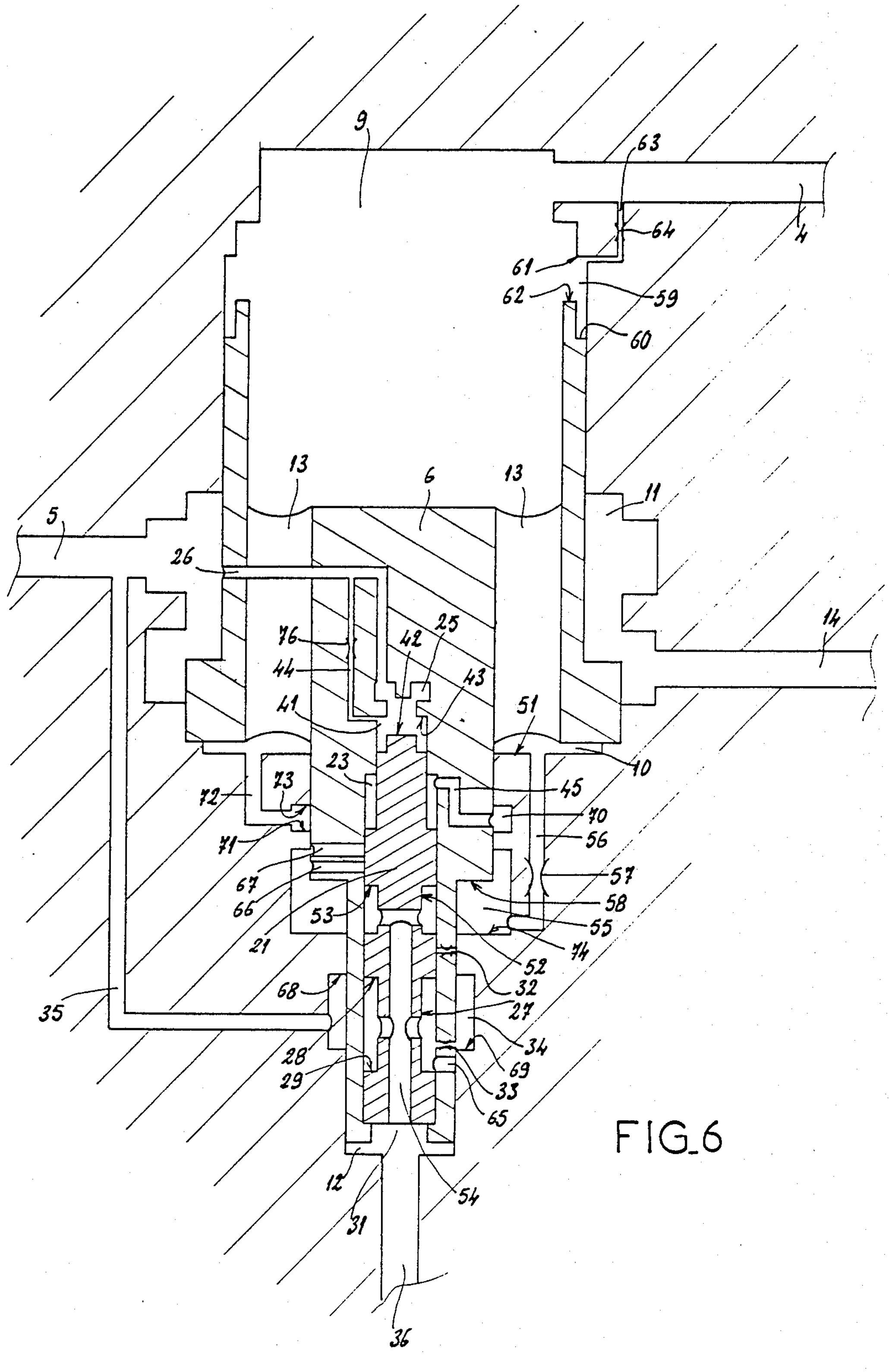
FIGS. 6 to 10 are five longitudinal sectional views of an apparatus equipped with another distributor during five functional phases.

FIG. 6 shows the position of the distribution unit when the percussion piston 1 rises. The relative positions of the distributor 6 with respect to the body of the apparatus and of the valve 21 with respect to the distributor body are such that:

the chamber 59 is integrated with the chamber 9 and entirely subjected to the feed chamber;

the chamber 23 is connected to the high pressure of the chamber 10 by the channel 45, the groove 70 and the channel 72;

the chamber 41 forms an integral part of the chamber 45;

the channels 67 and 66 are closed by the valve 21;

the calibrated orifice 32 is closed simultaneously by the body 2 of the apparatus and the stepped valve 21;

the calibrated orifice 33 connects the groove 34 and the groove 27, and consequently the control chamber 12 in the low-pressure circuit 5 by the channels 31, 54 and 35;

the channel 65 is closed by the section of the cylinder acting as a guide for the distributor;

the channel 14 is connected to the return circuit 5 by the distributor and the piston 1 rises (as in FIG. 1).

As soon as the edge 47 of the piston uncovers the channel 20, 19, 18 or 17 selected by the regulating valve 16, a large quantity of fluid under pressure can circulate through the control channel 36.

The pressure which develops in the chambers 12 and 22 through the circulation of the feed fluid through the calibrated orifice 33 is such that the valve 21 and the distributor 6 are placed out of equilibrium and begin their upward movements.

Since the valve 21 has a mass much less than that of the distributor 6, it will therefore move rapidly. During the movement, the oil contained in the chamber 23 will be forced through the channel 45, the groove 70 and the channel 72. The edge 29 of the groove 27 closes the channel 65 and then the calibrated orifice 33, and at the same time the edge 28 uncovers the calibrated orifice 32.

The edge 53 of the groove 52 uncovers in succession the channel 66, thus permitting an extra delivery of fluid under pressure to the chamber 55 from the control circuit 36 through the channels 31 and 54, and then one end of the channel 67, the other end remaining partially closed by the section of the distributor in the body 2. Finally, when the valve 21 has covered a large proportion of its travel, the edge 42 crosses the edge 43, the chamber 41 is then isolated from the chamber 25 and the oil that it contains will be obliged to circulate through the channel 44 and the calibrated orifice 76 so as to create a sufficient pressure to slow down the valve 21, thus avoiding any violent impact at the end of its travel.

Thus the valve 21 is equipped with a system of the DASH POT type.

Figure 7:
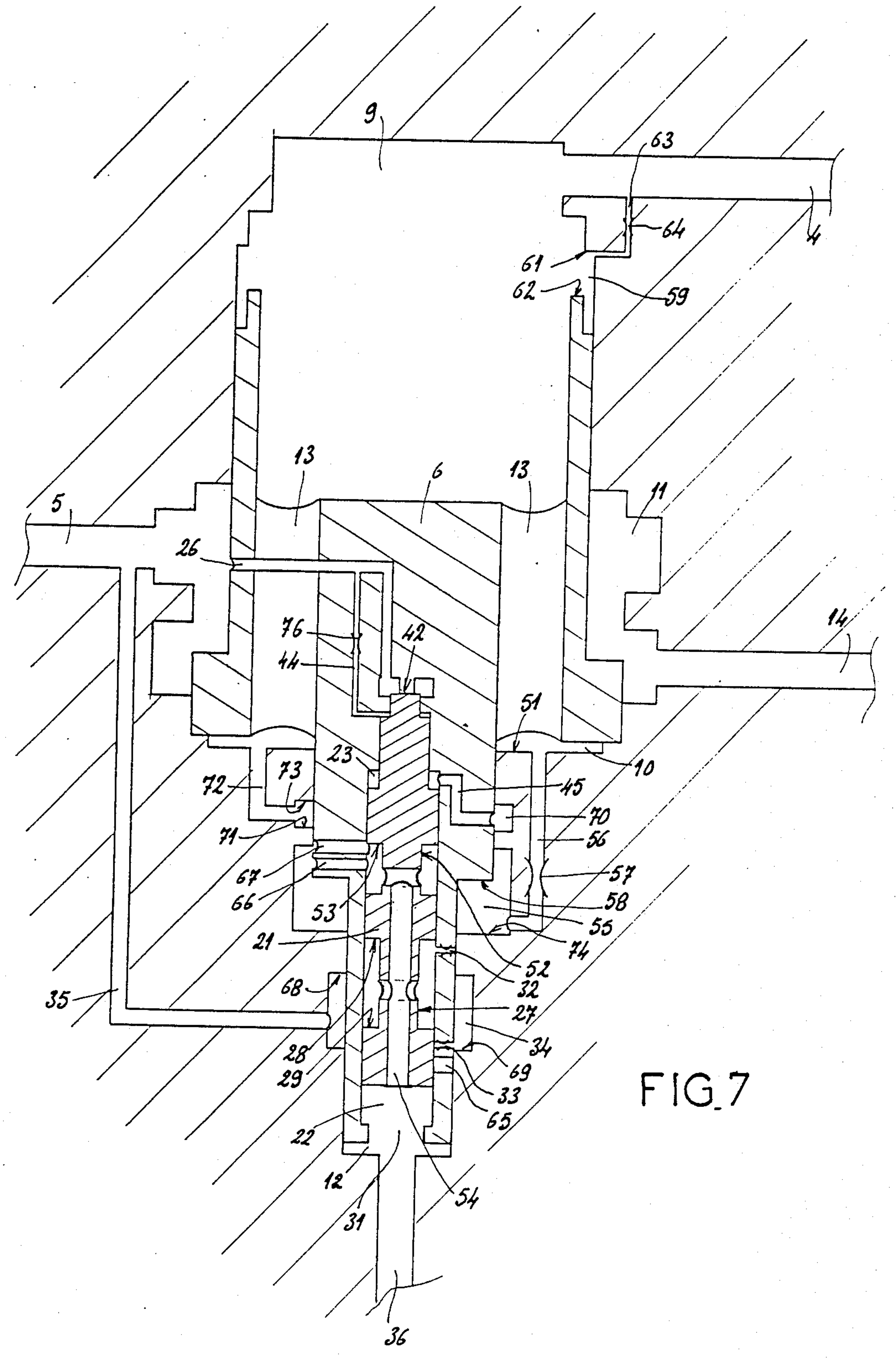

At this moment the distribution unit is in the position shown in FIG. 7.

Figure 8:
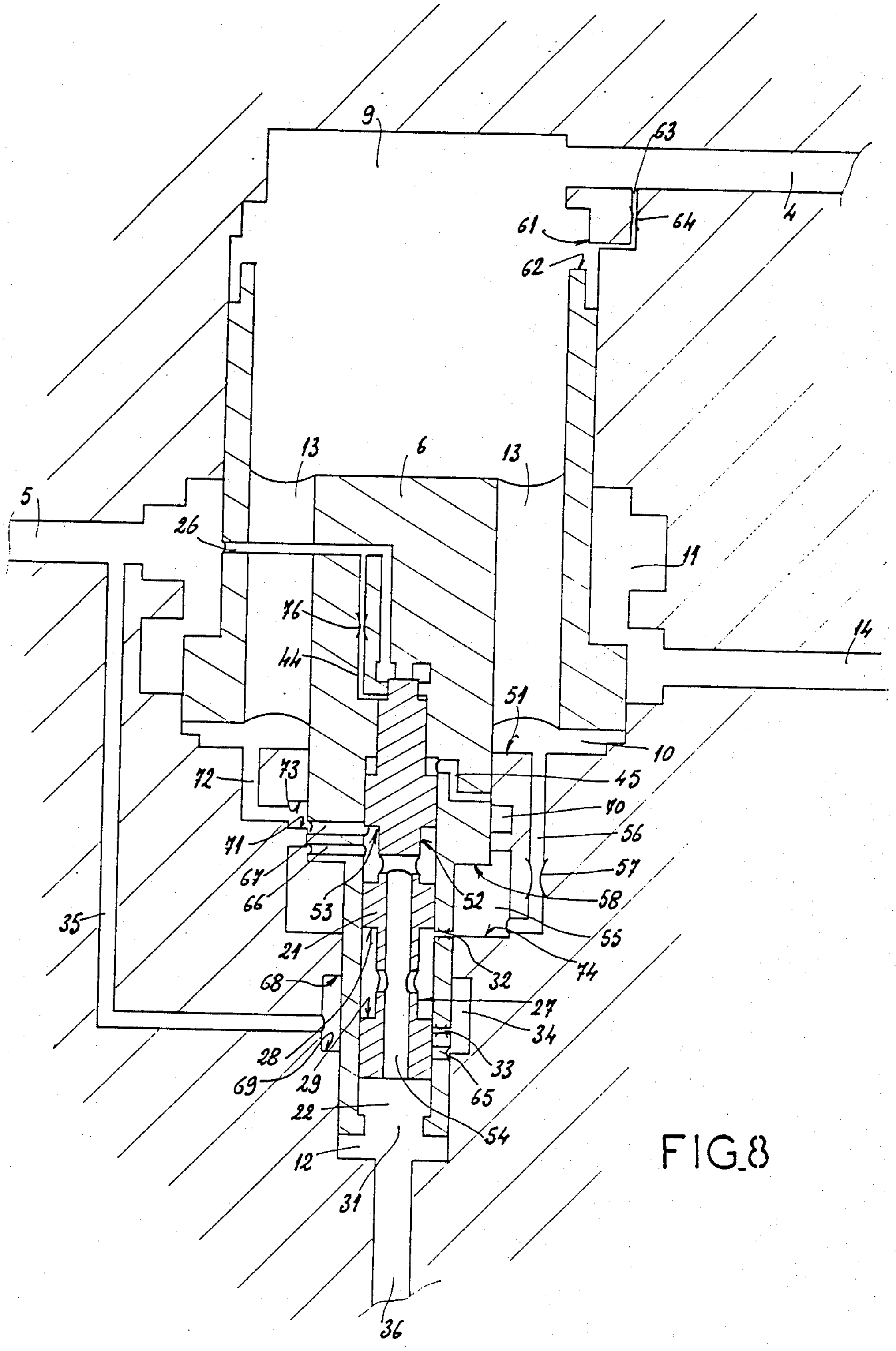

Simultaneously and with a lower acceleration, the distributor 6 moves upwards. During its passage:

the edge 73 closes the channel 45, thus locking the chamber 23 and, consequently, the valve 21 in its high position;

the edge 74 of the chamber 55 uncovers the calibrated orifice 32 which then connects the chamber 55 with the groove 27; and the edge 71 of the groove 70 uncovers the channel 67 which is then connected to the groove 52 and thus, through the channels 72, 66, 54 and 31, the chambers 55, 22 and 12 are subjected to the high pressure of the feed circuit (FIG. 8).

It should be noted that as soon as the calibrated orifice 32 is opened the control circuit is fed with fluid under pressure, the fluid circulating through the channel 56, the groove 55, the orifice 32, the groove 27 and the channel 54.

Simultaneously, the distributor 6 closes the channel 14 and then connects it to the feed circuit 4 and the piston 1 can then begin its downward movement and its edge 47 closes once more the control circuit selected. From this moment the fluid under pressure which is necessary for the movement of the distributor circulates through the channels 56, 72, 67, 66, 54 and 31.

The edge 62 of the distributor then passes the edge 61 and the fluid contained in the chamber 59 must then circulate through the calibrated orifice 64, and the pressure which is created in the chamber 59 brakes the distributor and then regulates its terminal velocity.

At the end of the travel the edge 51 of the chamber 10 uncovers the channel 45 and thus unlocks the chamber 23.

The edge 73 covers the channel 67 and then the channel 66 once more, and the ending of the movement of the distributor and the locking of it in its upper position are effected by the oil under pressure which circulates through the channels 72 and 56 and then through the calibrated orifice 32.

The edge 69 uncovers the channel 65.

Figure 9:
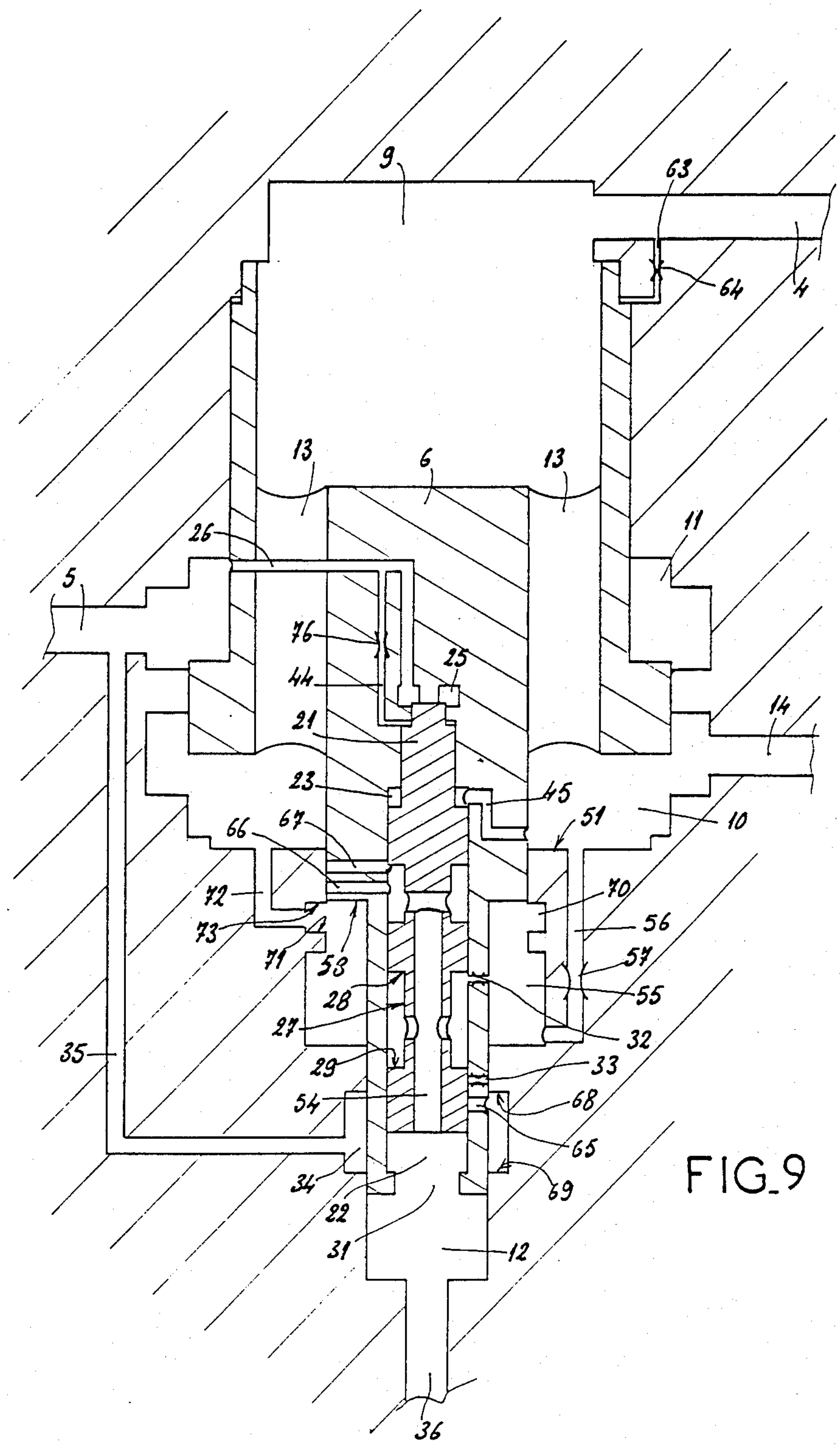

The distribution unit is then in the configuration shown in FIG. 9.

Shortly before impact, as described previously, the edge 37 uncovers the channel 17, which is then connected to the low-pressure return circuit 5, the control circuit comprising the channel 36, the chambers 12, 22 and the grooves 27 and 52 is then also connected to the return circuit of the apparatus.

The quantity of fluid able to circulate through the calibrated nozzle 32 at feed pressure being insufficient to maintain an equilibrium pressure in the said control circuit, the valve 21 and the distributor 6 begin their downward movements. The valve 21, the mass of which is much less than that of the distributor 6, moves rapidly, and during its movement the fluid under pressure circulates through the channel 45 and feeds the chamber 23, the edge 53 of the groove 52 closes the channels 67 and 66, the edge 28 closes the claibrated orifice 32, the edge 29 opens the calibrate orifice 33 and then the channel 65, which then creates a large passage between the control chambers 12 and 22 and the return circuit 5 of the apparatus by means of the groove 34 and the channel 35. From this moment on, the edge 37 of the piston 1 can re-close the channel 17 without influencing the movement of the distributor.

Figure 10:
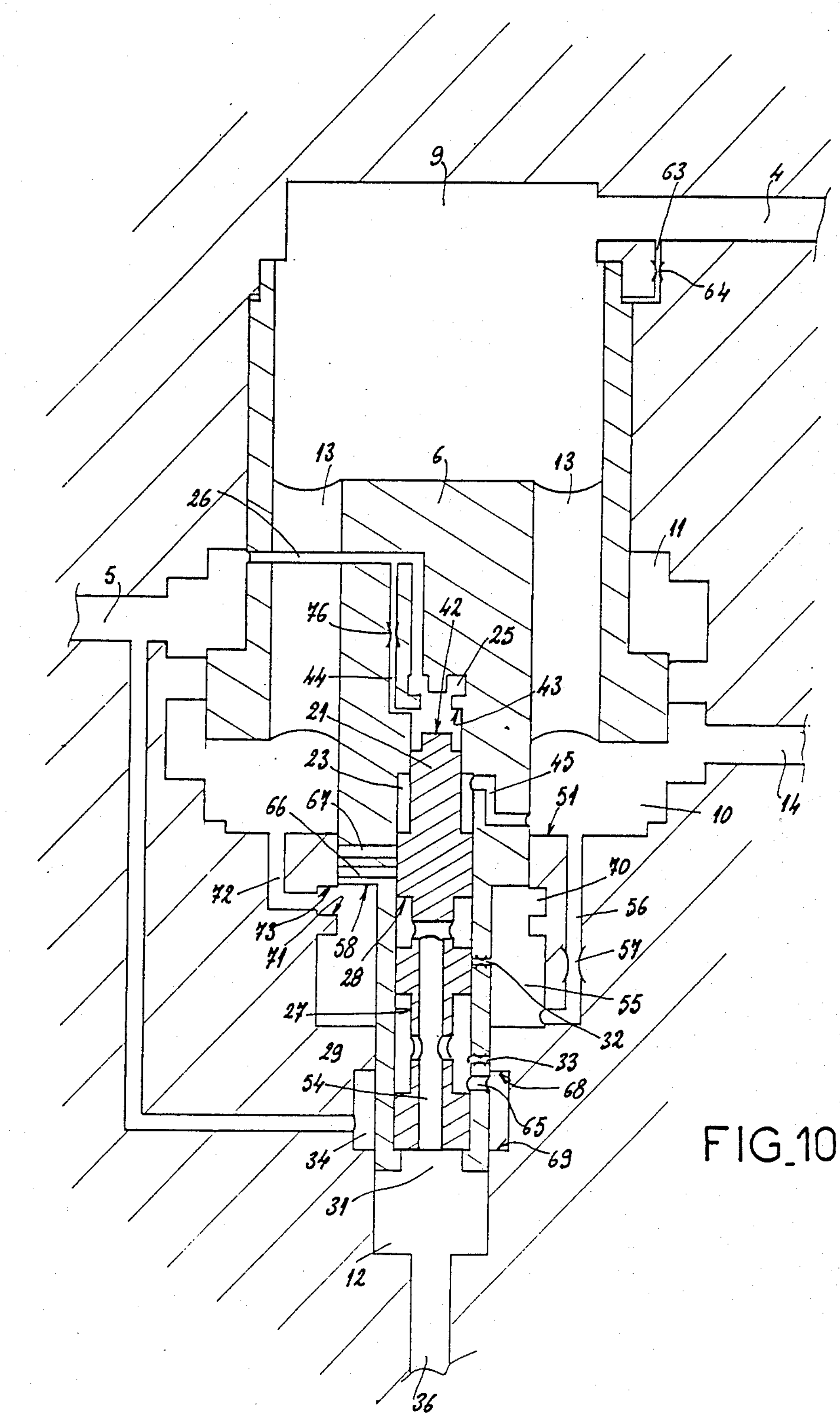

The distribution assembly is shown at this time in FIG. 10.

At the same time and with a lesser acceleration the distributor begins its descent. During its movement:

the edge 51 of the chamber 10 closes the channel 45 and thus locks the chamber 23;

the fluid under pressure contained in the chamber 55 is evacuated through the channel 72 until the edge 58 passes the edge 71, from which moment the fluid will have to circulate through the calibrated orifice 57 and the pressure created in the chamber 55 will first slow down the distributor and then regulate the speed of it;

the distributor 6 breaks the connection between the channel 14 and the feed circuit, then brings into communication the return circuit 5 of the apparatus and the channel 14, the piston 1 then being able to rise once more under the action of hydraulic forces;

the edge 68 uncovers the orifice 33 and the edge 74 of the chamber 55 once more covers the calibrated orifice 32;

at the end of the travel the edge 71 closes the channel 67, the edge 69 closes the channel 65, the locking and the end of the travel being effected by the calibrated orifice 33, which then keeps the control circuit at the return pressure of the apparatus; and the edge 73 uncovers the channel 45 and unlocks the chamber 23 of the valve 21 which will thus be able to react to the next control pulse.

The distribution assembly then occupies the positions shown in FIG. 6.

The piston 1 competes its upward movement and the cycle described may resume.

The device shown in FIGS. 11 to 15 of the drawing is a variant of that described previously with reference to FIGS. 6 to 10 which makes it possible to adjust the speed of the upward movement of the distributor during part of its course depending on the quantity of fluid under pressure which circulates through the control channel 36.

It is thus possible to vary the time which elapses between the moment at which the distributor begins to move and that at which it will open the feed of fluid under pressure to the chamber 3.

Consequently the time of the upward movement of the percussion piston 1 and of its travel vary simultaneously.

The travel of the percussion piston 1 can therefore be modified simply by controlling the quantity of fluid under pressure which can circulate through an orifice of variable section 78 located on the channel 20. A passage of small cross-section will correspond to a long travel and, conversely, an orifice of large cross-section to a short travel.

This device may, of course also function with a stroke-selection valve 16 as previously described, in which case the possibility of regulating the time of the upward movement of the distributor is not utilized.

In this configuration the chamber 55 is no longer constantly connected to the feed circuit by the channel 56 which includes the calibrated orifice 57. On the other hand, an orifice 77 is provided in the body of the distributor 6 which, depending on the position of the valve 21, is able to permit a communication between the chamber 55 and the control circuit 36 by means of the groove 52, the channel 54, the chamber 22, the channel 31 and the control chamber 12.

The edge 79 constitutes the lower end of the groove 52.

Figure 11:
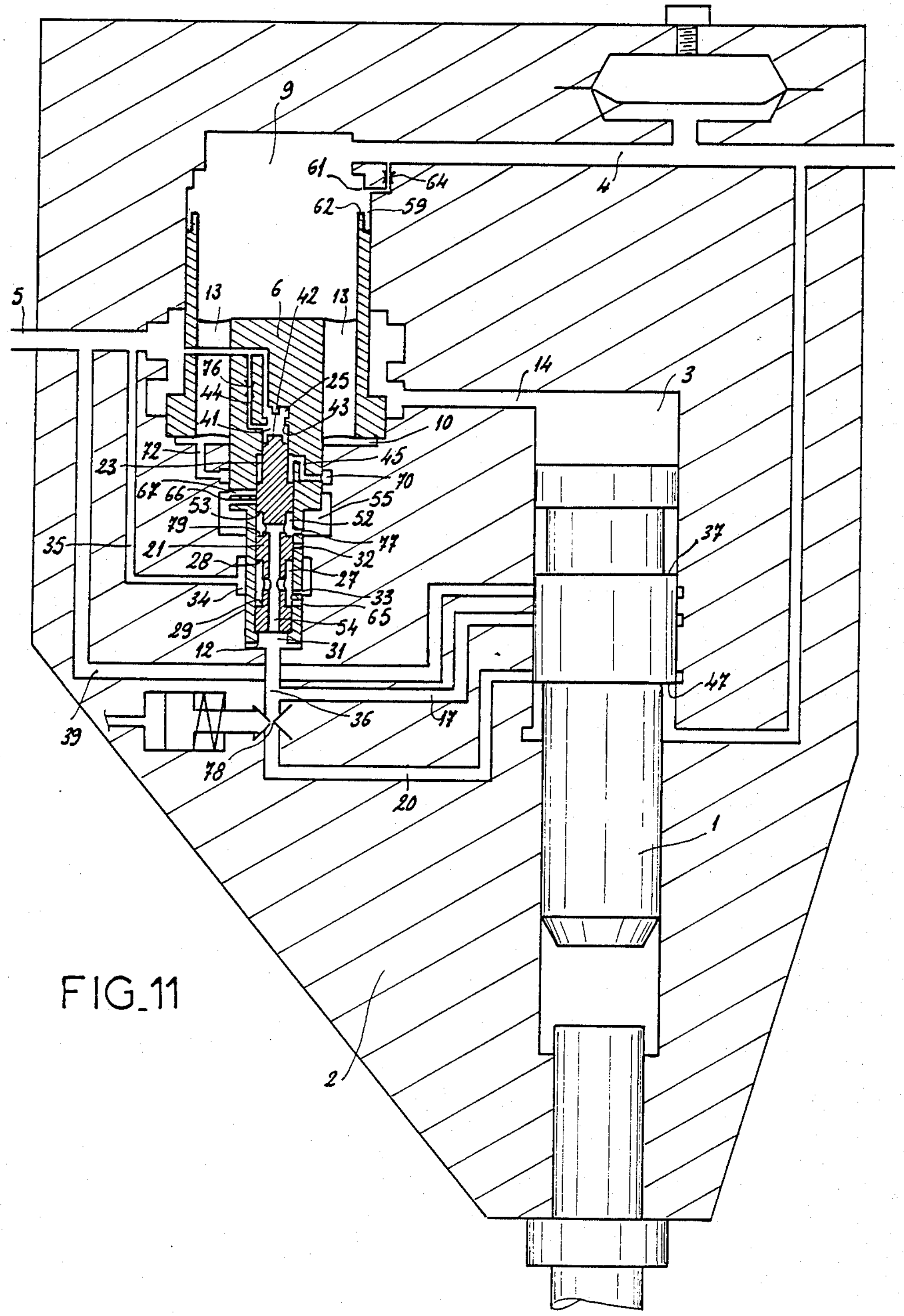
FIGS. 11 to 15 are five views corresponding to those in FIGS. 6 to 10, showing an apparatus equipped with another distributor.

The operation of the apparatus is as follows: FIG. 11 shows the position of the distribution assembly when the percussion piston 1 rises. The relative positions of the distributor 6 with reference to the body of the apparatus and of the valve 21 with respect to the distributor body are such that:

the chamber 59 is integrated with the chamber 9 and entirely subjected to the feed pressure;

the chamber 23 is connected to the high pressure of the chamber 10 by the channel 45, the groove 70 and the channel 72;

the chamber 41 forms an integral part of the chamber 25;

the channels 67 and 66 are closed by the valve 21;

the calibrated orifice 32 is closed simultaneously by the body 2 of the apparatus and the stepped valve 21;

the calibrated orifice 33 connects the groove 34 and the groove 27 and, consequently, the control chamber 12, with the low-pressure circuit 5 by way of the channels 31, 54 and 35;

the channel 65 is closed by the part of the cylinder which serves as a guide for the distributor;

the channel 14 is connected to the return circuit 5 by the distributor and the piston 1 rises (as in FIG. 11); and the calibrated orifice 77 connects the chamber 55 with the control circuit 36 by means of the groove 52 and the channels 54 and 31.

As soon as the edge 47 of the percussion piston 1 opens the channel 20, fluid under pressure flows through the variable orifice 78 and the control channel 36.

In the case of normal operation, the pressure which is developed in the chambers 12 and 22 by the flow of the feed fluid through the variable orifice 78 and the calibrated orifice 33 is sufficient to force the valve 21 and the distributor 6 out of equilibrium and thus to start the upward movements of them. In the opposite case it will be necessary to wait for the edge 47 of the piston 1 to open the channel 17 to permit a large quantity of fluid under pressure to flow through the control channel 36, this case corresponding to the maximum stroke of the piston and constituting a safety device if the adjustment of the minimum cross-section of the variable orifice 78 is too small.

Since the mass of the valve 21 is much less than that of the distributor 6, it will move rapidly. During its movement the oil contained in the chamber 23 will be forced through the channel 45, the groove 70 and the channel 72. The edge 29 of the groove 27 closes the channel 65, then the calibrated orifice 33, and at the same time the edge 28 opens the calibrated orifice 32.

The edge 79 of the groove 52 closes one end of the calibrated orifice 77.

The edge 53 of the groove 52 opens in succession the channel 66, permitting the delivery to the chamber 55 of fluid under pressure from the control circuit 36 by way of the channels 31, 54 and the variable orifice 78, and then one end of the channel 67, the other end remaining partially closed by the portion of the distributor in the body 2. Finally, when the valve 21 has completed a considerable proportion of its travel, the edge 42 passes the edge 43, the chamber 41 is then isolated from the chamber 25 and the oil which it contains will have to flow through the channel 44 and the calibrated orifice 76 so as to create a pressure sufficient to slow down the valve 21, thus avoiding any violent impact at the end of the stroke. Thus it can be said that the valve 21 is equipped with a system of the DASH POT type.

Figure 12:
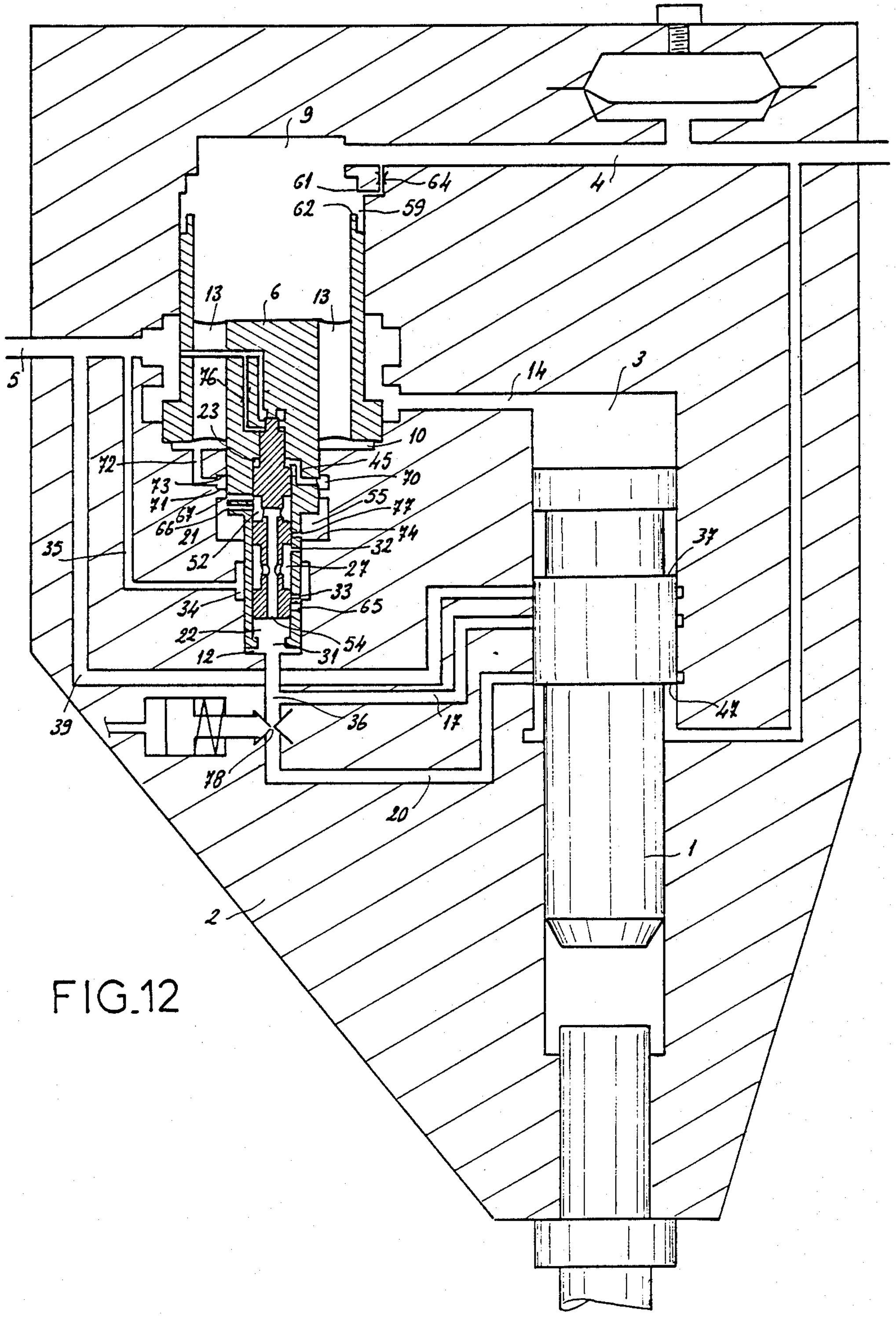

At this moment the distribution unit is in the position shown in FIG. 12.

At the same time, and with a lesser acceleration, the distributor 6 moves upwards. The rate of its movement then depends on the quality (sic) of fluid under pressure which passes through the variable orifice 78 and which feeds the chambers 12 and 55.

The edge 73 closes the channel 45, thus locking the chamber 23 and, consequently, the valve 21 in its upper position.

The edge 74 of the chamber 55 opens the calibrated orifice 32 which the connects the chamber 55 to the groove 27.

Figure 13:
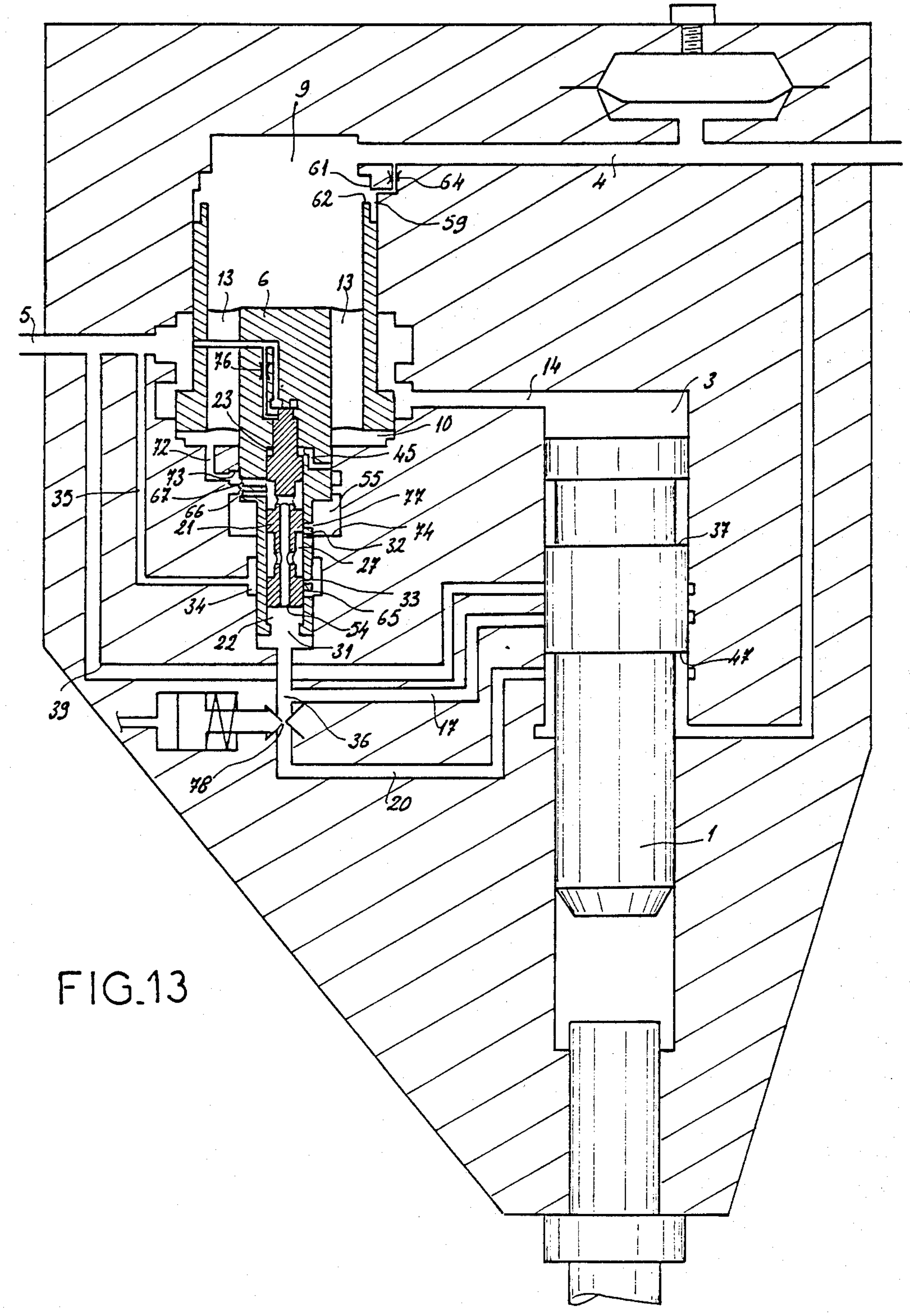

The edge 71 of the groove 70 opens the channel 67, which is then connected to the groove 52 and therefore, by means of the channels 72, 66, 54 and 31, the chambers 55, 22 and 12 are subjected to the high pressure of the feed circuit (FIG. 13). From this moment onwards the movement of the distributor becomes independent of the cross-section of the orifice 78.

At the same time, the distributor 6 closes the channel 14 and then connects it to the feed circuit 4, and the piston 1 can then start its descent and its edge 47 once more closes the control circuit selected. From this time onwards the fluid under pressure which is necessary for the movement of the distributor flows through the channels 72, 67, 66, 54 and 31.

The edge 62 of the distributor then passes the edge 61, the fluid contained in the chamber 59 must then flow through the calibrated orifice 64 and the pressure which is then created in the chamber 59 retards the distributor and then regulates its terminal velocity.

At the end of the stroke the edge 51 of the chamber 10 opens the channel 45 and thus unlocks the chamber 23.

The stop 73 covers the channel 67 and then the channel 66, while the end of the movement of the distributor and the locking of it in the upper position are then brought about by the oil under pressure which flows through the channel 72 and then through the calibrate orifice 32.

The edge 69 uncovers the channel 65.

Figure 14:
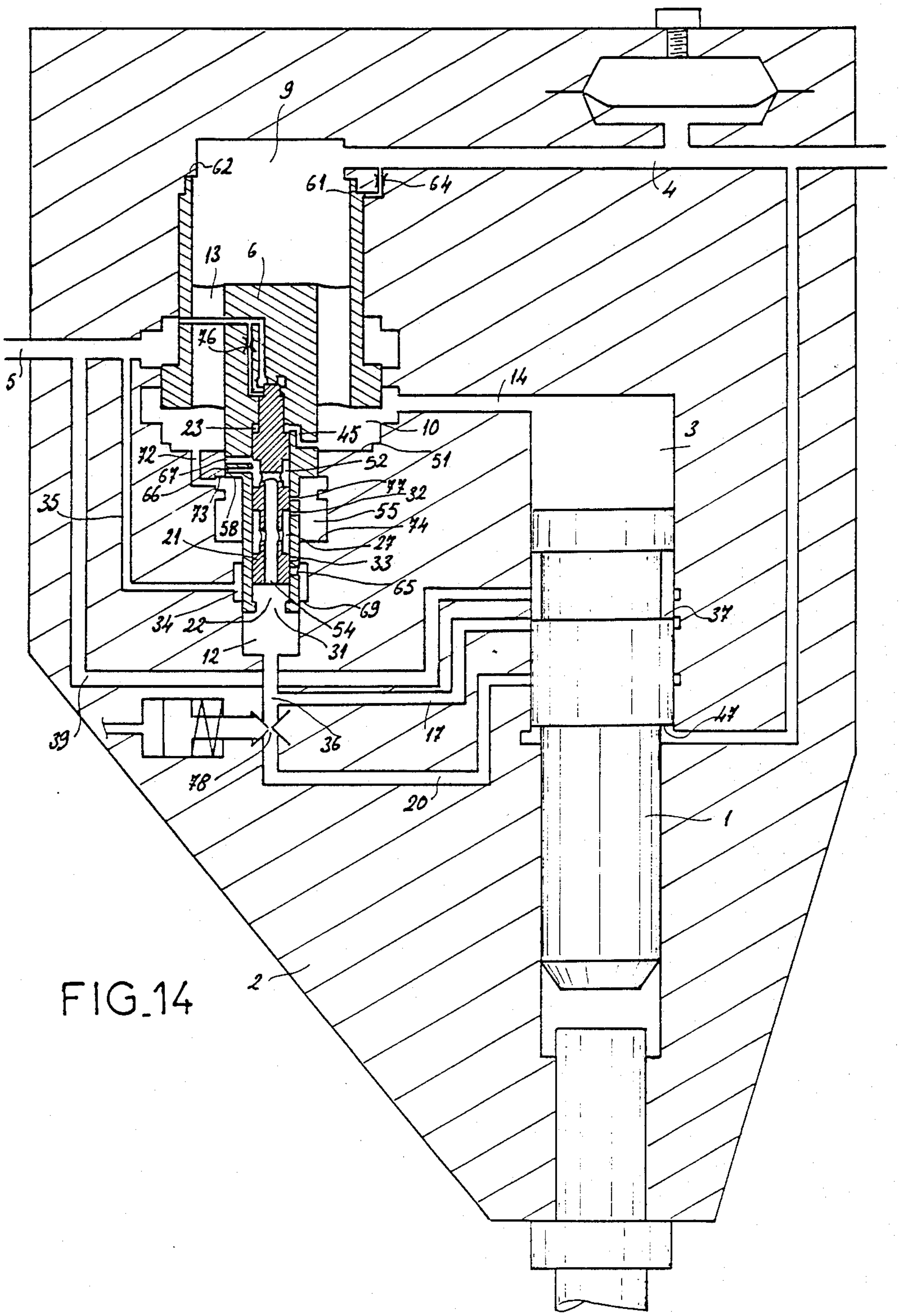

The distribution unit is then in the configuration shown in FIG. 14.

Shortly before impact, as described previously, the edge 37 opens the channel 17, which is then connected to the low-pressure return circuit 5, and the control circuit including the channel 36, the chambers 12, 22 and the grooves 27, 52 is then also connected to the return circuit of the apparatus.

Since the quantity of fluid which is able to flow through the calibrated nozzle 32 at the feed pressure is insufficient to maintain an equilibrium pressure in the control circuit mentioned above, the valve 21 and the distributor 6 start their downwards movements. The valve 21, the mass of which is much less than that of the distributor 6, moves rapidly throughout its movement, the fluid under pressure flows through the channel 45 and feeds the chamber 23, the edge 53 of the groove 52 closes the channels 67 and 66, the edge 79 of the groove 52 uncovers the calibrated orifice 77, the edge 28 closes the calibrated orifice 32, the edge 29 uncovers the calibrate orifice 33 and then the channel 65, which then forms a large passage between the control chambers 12 and 22 and the return circuit 5 of the apparatus by means of the groove 34 and the channel 35. From this time onwards the edge 37 of the piston 1 may cover the channel 17 without affecting the movement of the distributor.

Figure 15:
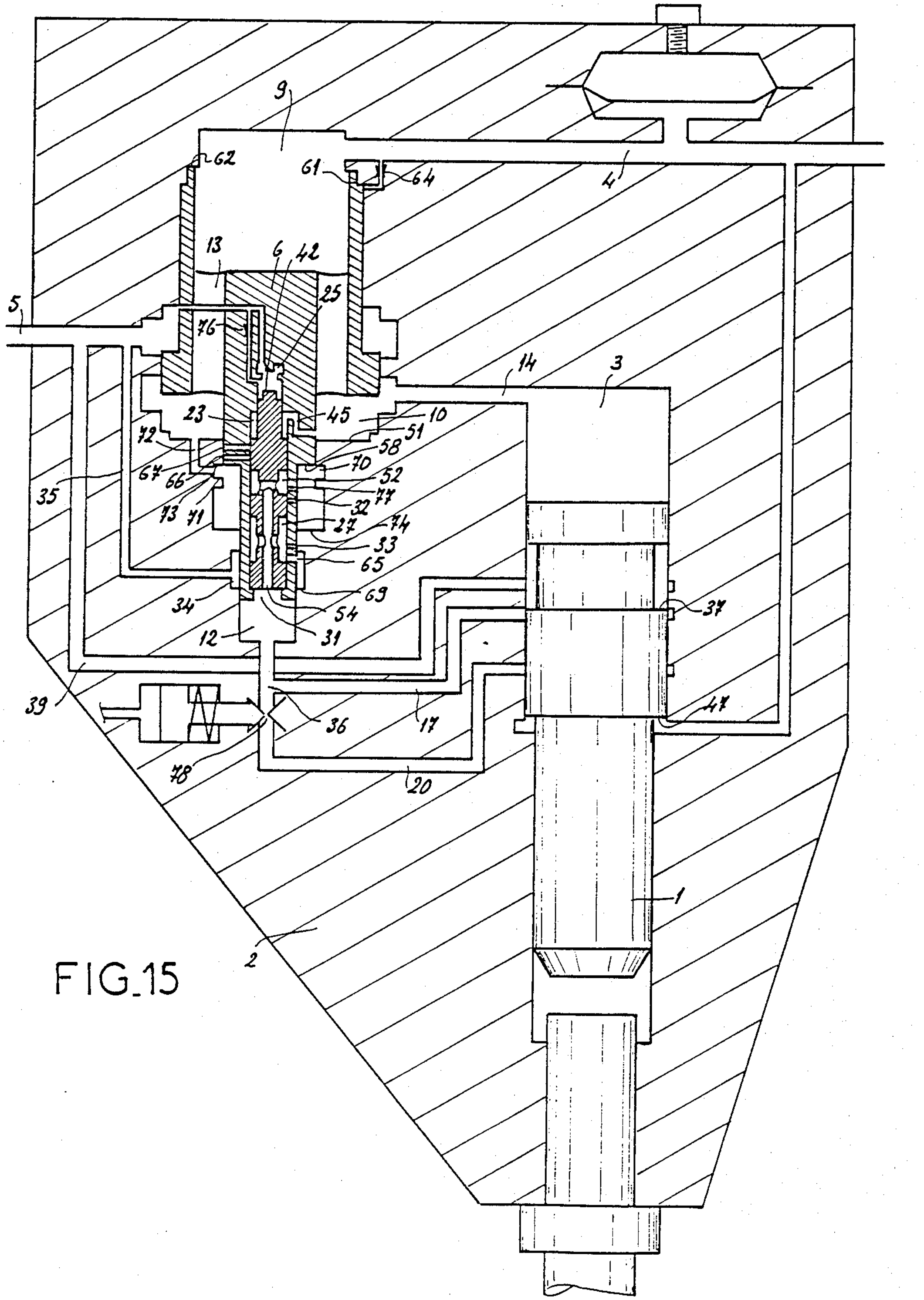

The distribution unit is shown at this time in FIG. 15.

At the same time and with a lesser acceleration the distributor begins its descent. During its movement:

The edge 51 of the chamber 10 closes the channel 45 and thus locks the chamber 23;

The fluid under pressure contained in the chamber 55 is evacuated through the channel 72 until the edge 58 passes the edge 71, from which time on the fluid will have to flow through the calibrated orifice 77, the groove 52, the channel 54, the groove 27 and the channel 65. The pressure created in the in the chamber 55 will first retard the distributor and then regulate the speed of it.

The distributor 6 breaks the connection between the channel 14 and the feed circuit, then establishes a communication between the return circuit 5 of the apparatus and the channel 14 and the piston can then rise under the action of hydraulic forces.

The edge 68 opens the orifice 33 and the edge 74 of the chamber 55 covers the calibrated orifice 32 once more.

At the end of the stroke the edge 71 closes the channel 67, the edge 69 closes the channel 65, and the locking and the end of the travel are brought about by the calibrated orifice 33, which then keeps the control circuit at the return pressure of the apparatus.

The edge 73 opens the channel 45 and unlocks the chamber 23 of the valve 21, which will thus be able to react to the next control pulse.

The distribution unit then occupies the positions illustrated in FIG. 11.

The piston 1 completes its upward stroke and the cycle described may recommence.

I claim:

1. A hydraulic percussion apparatus, comprising:

a percussion piston hydraulically reciprocatable toward and away from a tool and adapted to strike said tool to impart percussion thereto;

means defining a main cylinder receiving said percussion piston and forming with said percussion piston a driving chamber pressurizable to drive said percussion piston toward said tool;

a high-pressure source of a hydraulic medium;

a low-pressure source of said hydraulic medium; and a hydraulic distributor between said sources and said driving chamber for alternately connecting said high-pressure source and said low-pressure source to said driving chamber in dependence upon position of said percussion piston to respectively accelerate descent of said percussion piston and permit upward return travel of said percussion piston, said distributor comprising:

means defining a working cylinder of said distributor communicating with said sources, a distributor body slidable in said working cylinder and defining in said cylinder a distributor control chamber connectable by said body successively with said high-pressure source and said low-pressure source, and a bore communicating with said distributor control chamber, a valve shiftable in said bore and defining a valve control chamber in said bore and in continuous communication with said distributor control chamber by a channel, said valve being shiftable in said body in opposite directions in dependence upon the source to which said valve control chamber is connected, and a hydraulic circuit formed in said valve and having one end continuously communicating with said valve control chamber and another end selectively connectable to said high-pressure source upon communication of said control chambers with said high-pressure source in dependence upon the position of said percussion piston and to said low-pressure source upon communication of said control chambers with said low-pressure source in dependence upon the position of said percussion piston.

2. The hydraulic percussion apparatus defined in claim 1 wherein said valve is positioned to slide in said body coaxially therewith.

3. The hydraulic percussion apparatus defined in claim 1 wherein said distributor control chamber and said valve-control chamber are disposed at corresponding ends of said distributor body and said valve, respectively, and said body and said valve move in the same direction on successive connections of said control chambers with said high-pressure source and said low-pressure source respectively.

4. The hydraulic percussion apparatus defined in claim 1 wherein said valve defines within said bore two chambers pressurizable to act in the same direction upon said valve and in addition to said valve-control chamber, one of said two chambers being continuously connected to said low-pressure source and the other chamber being continuously connected to said high-pressure source.

5. The hydraulic percussion apparatus defined in claim 1 wherein said valve defines within said bore one chamber in addition to said valve-control chamber and permanently connected to said low-pressure source and being provided with a spring acting on said valve in a direction urging said valve toward said valve-control chamber, said spring applying to said valve a mechanical force and pressure from said source applying to said valve hydraulic forces so that resultants of the hydraulic and mechanical forces on said valve act alternately in one direction and the other.

6. The hydraulic percussion apparatus defined in claim 1 wherein said valve is formed with a groove communicating continuously with said control chamber and communicating alternately with calibrated orifices traversing said distributor body and communicating respectively with said high-pressure source and said low-pressure source.

7. The hydraulic percussion apparatus defined in claim 6 wherein said valve defines in said bore a further chamber located at an opposite end of said valve from said valve-control chamber and communicating through a calibrated orifice with said low-pressure source, said body defining an additional chamber at the end of its upward travel communicating by a calibrated orifice with said high-pressure source, said distributor further comprising means in said body locking said valve to said body after movement of said valve in one direction and prior to a corresponding movement of said body.

8. The hydraulic percussion apparatus defined in claim 7 wherein said valve defines in said bore of said body two chambers in addition to said valve control chamber and pressurizable to act upon said valve in opposite directions, one of said two chambers being continuously connected to said low-pressure source, the other of said two chambers being continuously connected to said high-pressure source for respective end of travel position of said body and being isolated from the respective source in intermediate positions of the distributor body for effecting locking of the valve in the said body.

9. The hydraulic percussion apparatus defined in claim 7 wherein said valve comprises a second groove continuously communicating with the first-mentioned groove and said valve-control chamber and adapted during displacement of said valve to unblock orifices formed in said body for communicating with said control chambers and with said high-pressure source during a movement of said distributor body between a position in which said distributor body connects said driving chamber with said low-pressure source and a position in which said distributor body connects said driving chamber with said high-pressure source.

10. The hydraulic percussion apparatus defined in claim 7 wherein said body is provided with a large-dimension orifice adapted to connect said control chambers with said low-pressure source when said body is in an extreme position in which said driving chamber communicates with said high-pressure source and said valve is in a position in which said valve-control chamber has a minimum volume.

11. The hydraulic percussion apparatus defined in claim 23 wherein said control chambers, said valve and said body are arranged so that, starting from a position wherein said driving chamber communicates with said low-pressure source, said control chambers are connected to the high-pressure source by the passage of the percussion piston past a given point in its stroke, the valve is displaced initially rapidly and thereafter slowly to terminate travel of the valve upon closure of a chamber at the opposite end of said valve from said valve-control chamber by closing a passage in said body, said body being displaced at the same time and at a lesser speed to interrupt communication between said driving chamber and the low-pressure source and to connect said driving chamber to said high-pressure source, said body slowing at an end of its travel on closure of a chamber defined by said body at an end thereof opposite said distributor control chamber, whereupon said percussion piston switches a command pressure applied to said valve so that said valve passes rapidly in a return stroke connecting said control chambers with said low-pressure source while said body is displaced rapidly in the same direction until it isolates said driving chamber from said high-pressure source and then more slowly until said driving chamber is connected with said low-pressure source, and finally returns said chamber at said opposite end of said valve to communicate with said high-pressure source and closes a passage connecting control chambers in said valve with said low-pressure source.

12. The hydraulic percussion apparatus defined in claim 7, further comprising a channel connected to said high-pressure source and provided with an orifice regulating emptying of an annular chamber connected continuously to said high-pressure source and surrounding said body and thereby controlling speed of said body during downward movement of said body between a position wherein said body closes communication of said driving chamber with said high-pressure source and a position in which said body progressively connects the driving chamber with the low-pressure source.

13. The hydraulic percussion apparatus defined in claim 12 wherein said valve is provided with a groove continuously connected with said control chamber for selectively communicating with an orifice communicating through said body with said annular chamber.

14. The hydraulic percussion apparatus defined in claim 13 wherein said control chambers, said valve and said body are so arranged that starting from a position of said body and said valve in which said driving chamber is connected with said low-pressure source, said control chambers are connected to said high-pressure source by the passage of said percussion piston past a specific point in its displacement so that said valve is moved rapidly and closes said orifice communicating through said body with said annular chamber, said body being displaced at the same time and at a lesser speed regulated by fluid flow to interrupt communication between said driving chamber and said low-pressure source, whereby said body is thereafter accelerated to bring said driving chamber into communication with said high-pressure source, whereupon said percussion piston switches a command pressure, said body then isolates said driving chamber from said high-pressure source upon rapid movement and is being slowed until the driving chamber is communicated with the low-pressure source, as an edge of the body passes an edge of said working cylinder, fluid contained in a chamber bounded by said edge of said body being obliged to flow through an orifice and a control circuit to said low-pressue source.

15. The hydraulic percussion apparatus defined in claim 14 wherein the speed of said body is controlled by regulating the flow of fluid through an orifice of variable cross section.

16. The hydraulic percussion apparatus defined in claim 15 wherein said control circuit includes said orifice of variable cross section for modifying the movement time of said body during its upward travel, thereby modifying the stroke of said percussion piston.

* * * * *